(12) United States Patent
Agarwal et al.

(10) Patent No.: US 6,223,182 B1
(45) Date of Patent: Apr. 24, 2001

(54) DYNAMIC DATA ORGANIZATION

(75) Inventors: Nipun Agarwal, San Mateo; Linda Feng, San Bruno; Timothy Robertson, Woodside, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/106,448

(22) Filed: Jun. 30, 1998

(51) Int. Cl.[7] ................................................. G06F 17/30
(52) U.S. Cl. ............................................................ 707/102
(58) Field of Search ................................. 707/7, 3, 1, 102

(56) References Cited

U.S. PATENT DOCUMENTS

| | | | |
|---|---|---|---|
| 5,495,608 | * 2/1996 | Antoshenkov | 707/3 |
| 5,568,639 | * 10/1996 | Wilcox et al. | 707/200 |
| 5,649,181 | * 7/1997 | French et al. | 707/3 |
| 5,652,879 | * 7/1997 | Harris et al. | 707/201 |
| 5,710,915 | * 1/1998 | McElhiney | 707/3 |
| 5,873,097 | * 2/1999 | Harris et al. | 707/203 |
| 5,893,104 | * 4/1999 | Srinivasan | 707/102 |
| 5,963,956 | * 10/1999 | Smartt | 707/104 |

* cited by examiner

Primary Examiner—Wayne Amsbury
(74) Attorney, Agent, or Firm—Ditthavong & Carlson, P.C.

(57) ABSTRACT

A binary hyperspatial code (BH code) is generated for each row in a table to be partitioned. An intermediate table containing the BH codes and rowids of the original table is created within the database. The intermediate table allows for efficient database operations to be performed to determine how to partition the table without causing the data in the table to go off-line. After the desired partitions have been identified from accessing the intermediate table, the table is subdivided into the desired partitions. In one embodiment, the partitions are stored as index-organized tables index on the BH codes so that rows that are close together (as defined by the BH codes) are likely to be located in the same disk block.

18 Claims, 9 Drawing Sheets

| I_BHCODE | I_ROWID |
|---|---|
| 0120 | 1 |
| 0221 | 2 |
| 0310 | 3 |
| 0321 | 4 |
| 1001 | 5 |
| 1002 | 6 |
| 1023 | 7 |
| 1101 | 8 |
| 1122 | 9 |
| 1210 | 10 |
| 1220 | 11 |
| 1222 | 12 |
| 1223 | 13 |
| 1301 | 14 |
| 1302 | 15 |
| 1323 | 16 |
| 2000 | 17 |
| 2012 | 18 |
| 2021 | 19 |
| 2100 | 20 |
| 2111 | 21 |
| 2112 | 22 |
| 2121 | 23 |
| 2122 | 24 |
| 2131 | 25 |
| 2132 | 26 |
| 2202 | 27 |
| 2210 | 28 |
| 2220 | 29 |
| 2221 | 30 |
| 2230 | 31 |
| 2233 | 32 |
| 2302 | 33 |
| 2312 | 34 |
| 2331 | 35 |
| 3120 | 36 |
| 3203 | 37 |
| 3210 | 38 |
| 3301 | 39 |
| 3323 | 40 |

FIG. 4

| M_CCODE | M_LEVEL | M_PARALLEL |
|---|---|---|
| 210 | 3 | 1 |
| 211 | 3 | 1 |
| 212 | 3 | 1 |
| 213 | 3 | 1 |
| 220 | 3 | 2 |
| 221 | 3 | 2 |
| 222 | 3 | 2 |
| 223 | 3 | 2 |
| 10 | 2 | 3 |
| 11 | 2 | 3 |
| 12 | 2 | 3 |
| 13 | 2 | 3 |
| 20 | 2 | 4 |
| 23 | 2 | 4 |
| 0 | 1 | 4 |
| 3 | 1 | 4 |

| M_CCODE | M_LEVEL | M_COUNT |
|---|---|---|
| 01 | 2 | 2 |
| 02 | 2 | 2 |
| 03 | 2 | 2 |
| 10 | 2 | 2 |
| 11 | 2 | 2 |
| 12 | 2 | 2 |
| 2 | 1 | 4 |
| 3 | 1 | 2 |

| P_CCODE | P_COUNT | P_NEW |
|---|---|---|
| 210 | 1 | 3 |
| 211 | 2 | 3 |
| 212 | 2 | 2 |
| 213 | 2 | 2 |
| 220 | 1 | 1 |
| 221 | 1 | 1 |
| 222 | 2 | 2 |
| 223 | 2 | 2 |
| 10 | 3 | 5 |
| 11 | 2 | 4 |
| 12 | 4 | 6 |
| 13 | 3 | 3 |
| 20 | 3 | 4 |
| 23 | 3 | 3 |
| 0 | 4 | 6 |
| 3 | 5 | 7 |

| I_BHCODE | I_ROWID |
|---|---|
| 1210 | p1 |
| 1220 | p2 |
| 1222 | p3 |
| 1223 | p4 |
| 1200 | t1 |
| 1233 | t2 |

DYNAMIC DATA ORGANIZATION

FIELD OF THE INVENTION

The present invention relates to computer systems and more particularly to efficient techniques for organizing data.

BACKGROUND OF THE INVENTION

Very large databases pose significant challenges in storing, accessing, and managing data. Often, large databases attribute their size to a few very large tables or other database objects as opposed to a very large number of smaller tables. For example, most data warehouses and decision support systems have a few very large fact tables and several smaller lookup tables. As another example, spatial databases typically store the shape and location of large numbers of objects such as houses, streets, and zip code areas.

Partitioning is a strategy employed to improve the storage, access, and administrative performance of very large database objects. More specifically, a database object such as a relational database table or index is partitioned by subdividing the database object into several smaller independent subsets of the database object based on a "partition key." For "range partitioning" of non-spatial, relational database tables, the partition key is typically selected from among the date, primary key, or foreign key columns. The partition key is then used to divide the table into one or more ranges of values. When a query is issued to access and retrieve data from a range partitioned table, the database server can ignore partitions outside of certain ranges, thereby improving query performance and response time. For example, a very large on-line transaction processing (OLTP) database can be range partitioned based on the year. Thus, queries on the OLTP database that specify the year 1997 can safely ignore data in partitions for other years.

Spatial databases also benefit from partitioning. However, range partitioning on a spatial dimension is often inappropriate for spatial databases. For example, a common spatial query is: given a particular point in space, what objects are within a certain distance of the point? With this type of query, it is desirable to group data that is spatially close to each other, but range partitioning, on the other hand, groups data primarily according to a single dimension. For example, range partitioning along the x-axis may groups the point (1, 1) in the same partition as point (1, 100) even though point (2, 2) is much closer. Range partitioning is also inappropriate for multi-dimensional non-spatiotemporal data such as sales data (e.g., dollars and product codes) when no one dimension dominates over the other. Therefore, there is a need for a data partitioning methodology that can handle spatiotemporal data as well as non-spatiotemporal data in a way that does not cause one particular dimension to dominate the partitioning criteria.

Conventionally, data partitioning operates best if the entire set of data is provided at the time of partitioning, because an optimal size of the partitions is a function of the size of the data set and influences the performance of the query. In many real world situations, however, such as receiving spatial data from a satellite, the entirety of the data is not immediately available and therefore the data set needs to be incrementally partitioned.

Under conventional methodology, the data is originally partitioned based on a guess of the optimal partition size and then repartitioned after all the data has been collected. This process of repartitioning is very expensive and typically involves exporting the data from the database to a flat file outside the database system. The flat file is then analyzed to determine the partitions. While the data is being analyzed in the flat file, it is unavailable for queries. Furthermore, many of the high performance and reliability features that are characteristic of relational databases are unavailable to this extra-database partitioning process. For example, if the system goes down during the off-line repartitioning, the recovery features of the database system cannot be used to recover the repartition operation. Therefore, the repartition process is forced to start all over again. Consequently, the "downtime" of the data can be considerable if a large data set is partitioned. Therefore, there is a need for a data partitioning methodology that efficiently handles incremental partitioning and reduces the downtime during partitioning.

In conventional relational database systems, partitions are stored as tables organized into rows and columns. However, rows may be stored in the table in any order, so that rows that contain information about two points that are spatially close to each other could reside on separate disk blocks in the database, requiring multiple disk input/output operations to retrieve them. Therefore, there is a need for intra-partition physical clustering of spatial data so that the records for closely related spatial data will reside close to each other.

SUMMARY OF THE INVENTION

These and other needs are addressed by the present invention, in which a code for use as a partition key is generated by bit-interleaving values from at least two fields of a data container. In one aspect, bit-interleaving values to form a code for a partition key enables multi-dimensional non-spatial and non-temporal data to be used for partitioning even when no particular dimension is dominant.

Another aspect of the invention relates to a computer-implemented method and a computer-readable medium bearing instructions for organizing data in a data container with records and fields. Codes for records are determined based on bit-interleaving values from at least two of the fields of the corresponding records. A database object is created having rows, where each row corresponds to a record and has a first column for holding the codes for the record and a second column for holding a reference to the record. The database container is subdivided into subsets based on the database object. In one embodiment, another database object is created containing code prefixes corresponding to the subsets. Use of a database object within the database for partitioning reduces the downtime associated with conventional techniques that export the data outside the database.

Yet another aspect of the invention is directed to intra-partition physical clustering of data. Accordingly, data within a data container is organized by determining codes based on bit-interleaved field values and subdividing the data container into subsets based on the codes. The subsets are stored as a tree data structure, such as B-tree index, with entries corresponding to records in the data container and indexed on the codes for the corresponding records.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for organizing data are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table," "row," and "column" shall be used herein to refer respectively to the data container, record, and field.

Hardware Overview

Figure 1:
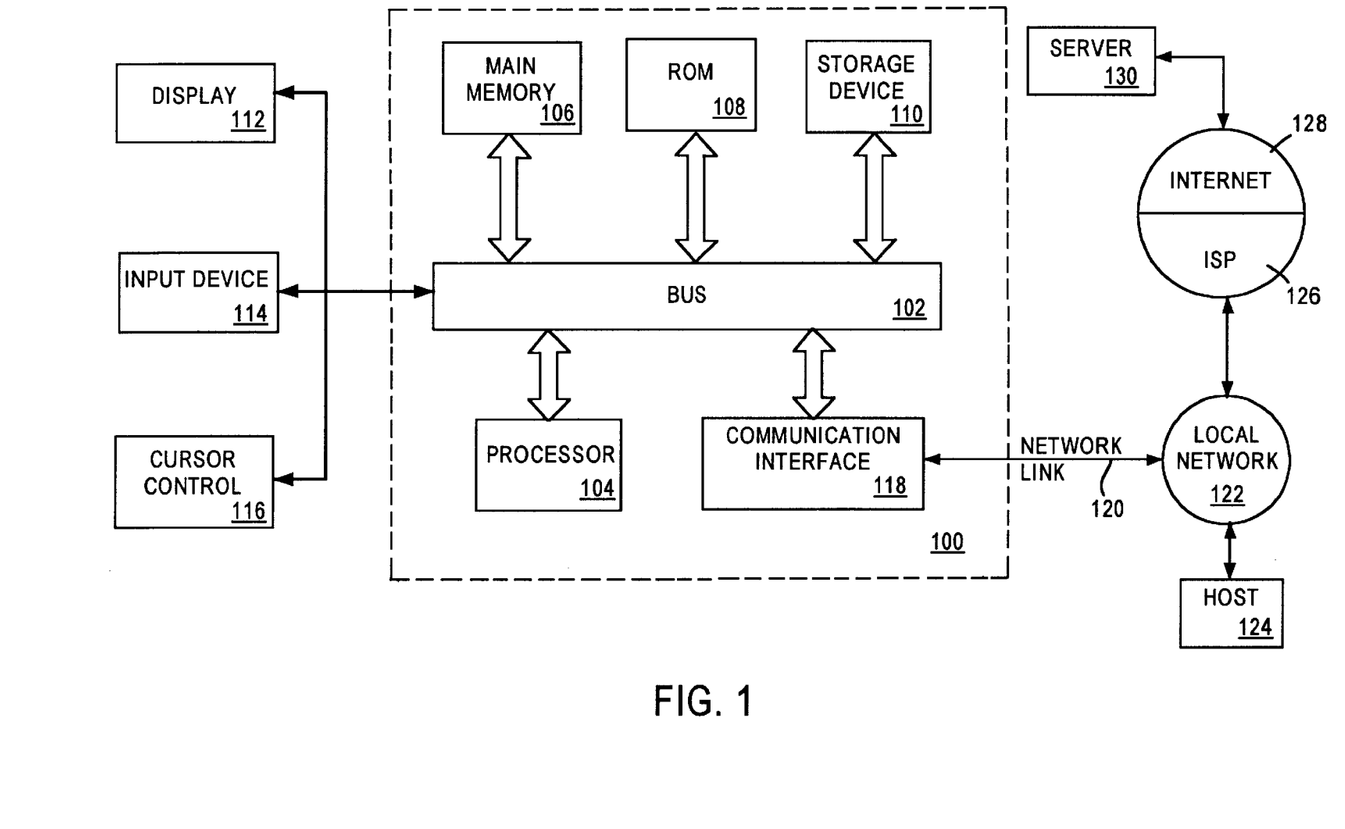
FIG. 1 depicts a computer that can be used implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for organizing data. According to one embodiment of the invention, organizing data is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for organizing data as described herein.

The received code may be executed by processor 104 as it is received, and/or stored in storage device 110, or other non-volatile storage for later execution. In this manner, computer system 100 may obtain application code in the form of a carrier wave.

Functional Overview

Figure 2:
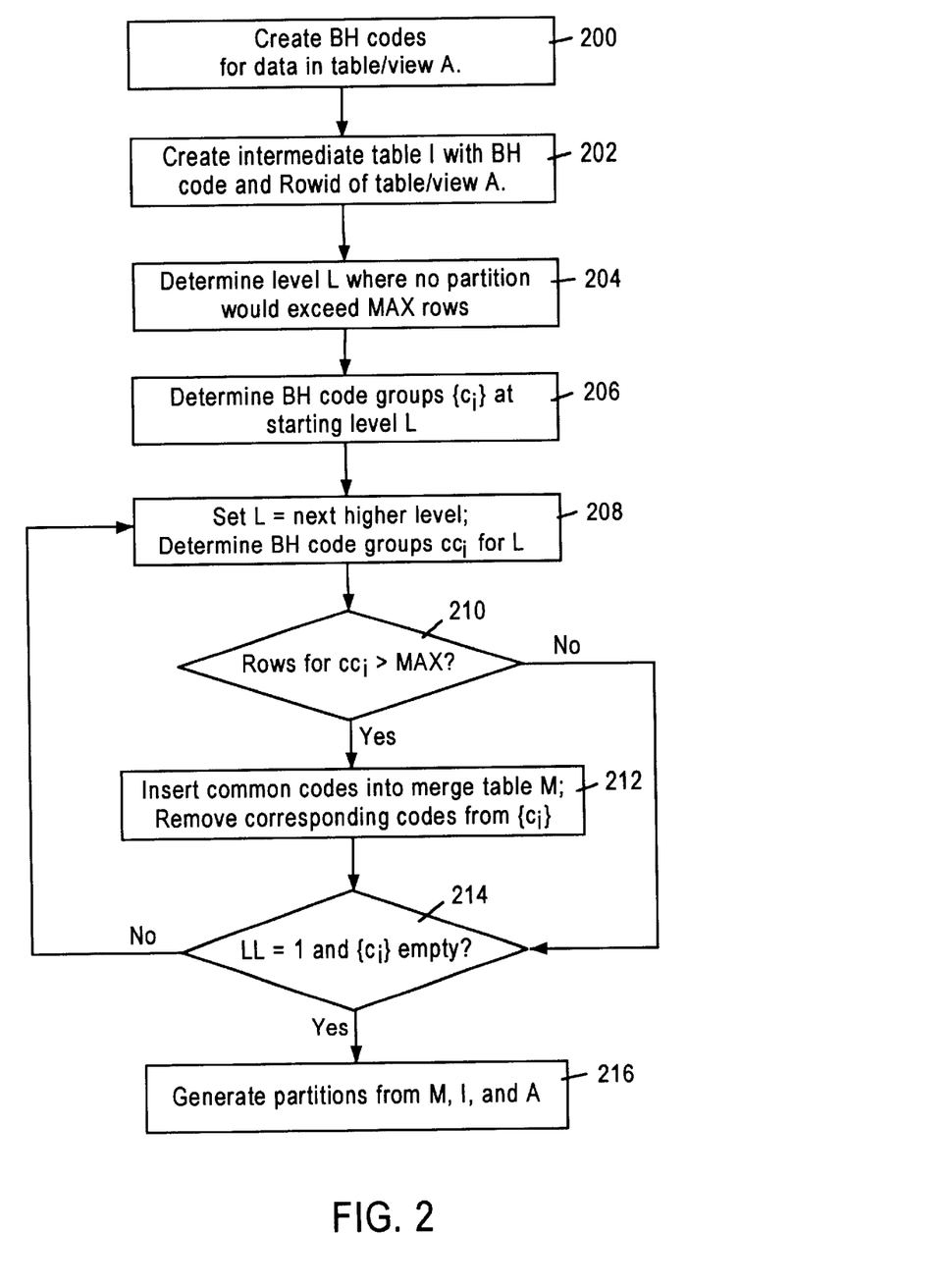
FIG. 2 is a flowchart showing a method of partitioning data according to an embodiment.

FIG. 2 is a flowchart depicting steps taken by one embodiment in partitioning a table into a number of independent subsets. In step 200, a binary hyperspatial code (BH code) is generated for each row in the table using values from two or more columns of the table. One advantageous feature of BH codes as a partition key is that they are produced by bit-interleaving values of the column, so that no one column dominates the partition key. Furthermore, BH codes can be truncated or padded, thereby providing support for combining point data and non-point data (e.g. areas) in the same table as well as data characterized by different resolutions.

Steps 202 through 214 pertain to an efficient technique for determining how to partition the table without having to export the table outside the database. More specifically, an intermediate table containing the BH codes and rowids of the original table or view is created within the database. The intermediate table allows for database operations to be performed to determine how to partition the table without causing the data in the table to go off-line.

Step 216 relates to a mechanism for generating the partitions after the desired partitions have been identified. In one embodiment, the partitions are stored as an index-organized table, within which the rows are sorted and stored based on the BH codes so that rows that are close together (as defined by the BH codes) are likely to be located in the same disk block.

Figure 3:
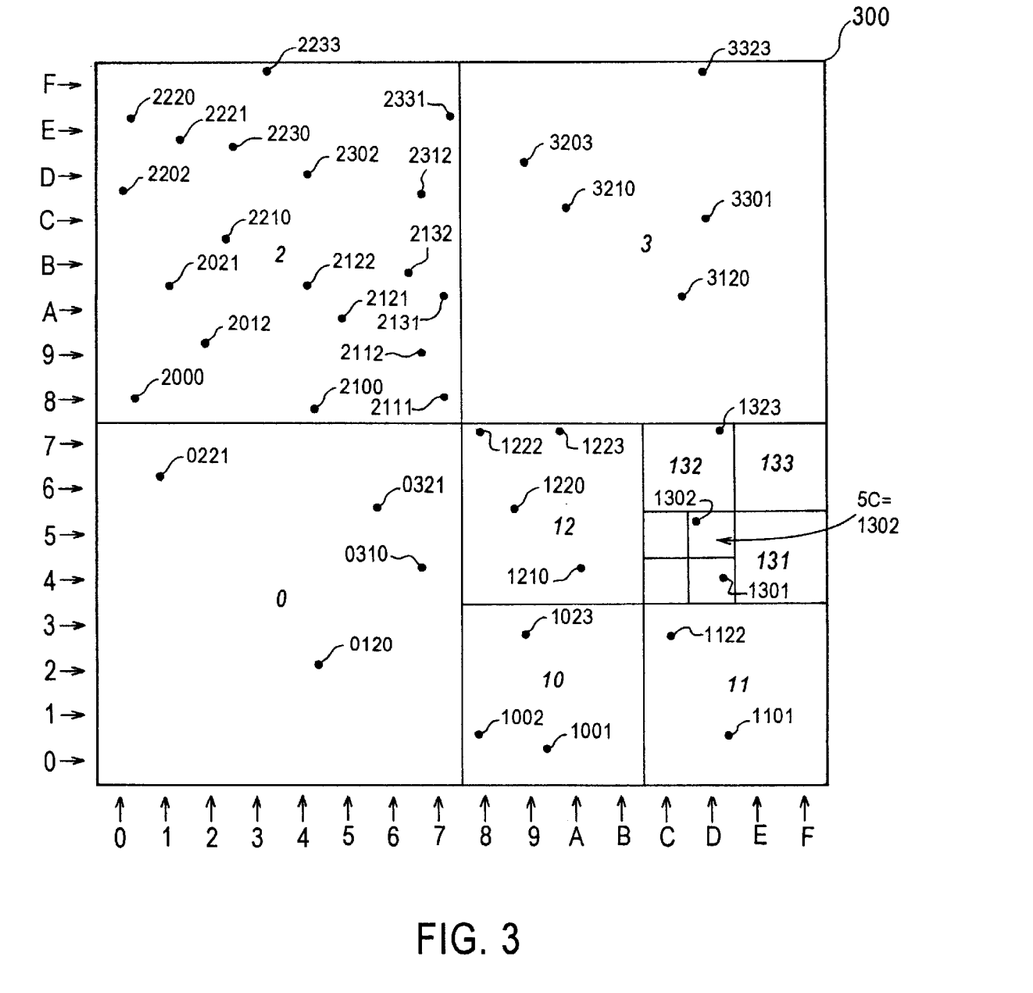
FIG. 3 depicts an exemplary space containing points and a recursive subdivision thereof.

Each step will be described in detail hereinafter using space 300, depicted in FIG. 3, comprising forty (40) points as a working example. Although the working example is directed to illustrating a particular implementation, it will be evident that the present invention is not limited to partitioning point data of a single resolution as in FIG. 3 but is applicable to partitioning multi-dimensional data of varying resolution.

BINARY HYPERSPATIAL CODES

Binary hyperspatial codes are disclosed the commonly assigned, co-pending U.S. patent application Ser. No. 08/827,987 entitled "Method and Apparatus for Multidimensional Database Using Binary Hyperspatial Code" filed on Oct. 2, 1996 by Keighan et al., the contents of which are hereby incorporated by reference herein, as a continuation of the commonly assigned U.S. patent application Ser. No. 08/342,922, filed on Nov. 21, 1994, now abandoned. Therein, spatial point data is encoded into BH codes by a space-filling curve such as a Peano code and partitioned based on that spatial encoding. BH codes have the property that closely located points tend to have lexically close BH codes. If a spatial database is partitioned using BH codes, determining the existence of an object near a point requires only the examination of a few partitions, thereby ignoring much irrelevant data.

BH codes model a regular, recursive decomposition of a space into a plurality of subspaces formed by dividing each coordinate direction in half. A two-dimensional space is subdivided into four rectangular subspaces, commonly called a quadtree, and, an n-dimensional space is divided into $2_n$ subspaces. Each subspace may be further subdivided into additional $2_n$ subspace as necessary. Depending on the resolution desired, there is no theoretical limit to the number of decomposition levels available, but practically the number of levels is limited by the particular computer system utilized. A thirty-two level decomposition of the world's surface is capable of attaining a resolution of 9.3 mm×4.7 mm. Thus, BH codes indicate an orderly decomposition of space.

Each subspace at a level of decomposition in a space is identified by a binary bit pattern having the same number of bits as number of dimensions of the space. Each bit indicates in which division of the two divisions in the corresponding dimension the subspace is located. For example, the four subspaces of a two-dimensional space are each identified by two bits, wherein one of the bits indicates one of the two divisions of one coordinate dimension (e.g., latitude) and the other bit indicates one of two divisions of the other coordinate dimension (e.g., longitude). More specifically, the lower-left subspace may be identified by the binary number 00, the lower-right subspace by the binary number 01, and the upper-left subspace and the upper-right subspace by the binary numbers 10 and 11, respectively. Each subspace, however, is conveniently identified by the quaternary digits 0, 1, 2, 3 (in base 4), corresponding to the binary numbers 00, 01, 10, and 11, respectively. As another example, the eight subspaces of a subdivided three-dimensional volume are identified by a three digit binary number, typically expressed by octal digits 0–7.

Since BH codes model a recursive decomposition of a space, the BH codes themselves may be defined recursively. Specifically, the BH code for a cell is defined by concatenating the BH code digits of its supercell with the appropriate bits for the cell at the current level. For example, the upper-left subcell of cell 130 is 1302, because the code 2 denotes the upper-left subcell of any cell. Referring to FIG. 3, the exemplary space 300 is recursively subdivided into space and labeled by an appropriate BH code in Italics. At the first level of decomposition in the example, the lower-left subspace, which includes only four points, is labeled 0 and the upper-right subspace, which five points, is labeled 3. The lower-right subspace of FIG. 3 is further decomposed into four subcells, of which the lower-left is labeled 10. BH codes can indicate any cell at any level of decomposition simply by concatenating enough digits. For example, referring again to FIG. 3, subspace 5C of the coordinate-style representation has a BH code of 1302 because cell 5C is located in the lower-right subspace (1) of the first level, then the upper-right subspace (3) of the second level, then the lower-left subspace (0) of the third level, and finally the upper-left subspace (2) of the fourth level.

A computer system, however, need not explicitly perform this recursive process to obtain the BH code, because the BH code can obtained iteratively by interleaving the bits of the coordinates at the appropriate level of resolution. For example, cell 5C has coordinates 0101 and 1100, expressed in the binary number system. Interleaving the bits 0101 (for 5) with 1100 (for C=12), yields the binary number 01110010. By grouping pairs of bits in the interleaved binary number as 01,11,00,10, the BH code of 1302 is obtained.

One aspect of the present invention stems from the realization that BH codes can be generated by bit-interleaving the multi-dimensional values of the desired partition key. Although BH codes were originally defined to model a recursive decomposition of space, the bit-interleaving method for generating the BH codes operates with any given multi-dimensional data, such as sales information, whether or not the "space" of the multi-dimensional data is comprehensible. Therefore, BH codes are not limited to describing only spatiotemporal points in space-time, but can be applied to any multi-dimensional data.

Referring back to FIG. 2, a BH code is generated for each row in the table to be partitioned by bit-interleaving values from at least two columns. In one implementation, the BH codes are stored in a dedicated column in the table to be partitioned. In another implementation, a view is created on the table such that the view contains at least the BH codes dynamically calculated from columns of the table. One way to create such a view is to execute the following Structured Query Language (SQL) statement: create view as select bhcode(lat, long, 4), * from table; where the function bhcode takes a latitude, a longitude, and precision of four levels (digits in the BH code). The table to be partitioned with a BH code column or the view with the BH code column will be referred to herein as table/view A. In the working example, the forty (40) points of space 300, whose BH code values at the fourth level of precision are labeled in FIG. 3, are stored as forty (40) corresponding rows in table/view A.

Identifying Partitions Based on the BH Codes

Determining to which partition a row of table/view A belongs is a function of the BH code for the row, the BH code for neighboring rows, and a parameter, called MAX, that indicates a maximal partition size. Preferably, the MAX parameter is user configurable and will typically have a value of around 10,000 or 32K; however, for purposes of illustration, herein it will be assumed that the MAX parameter is 5. Since the BH codes of the corresponding rows play a large part in determining which partitions the rows belong to, it is desirable to provide such information in a separate data structure to avoid performing multiple, expensive passes over table/view A. Advantageously, this information is not exported to a flat file, but copied into a database object, thereby allowing the table to remain accessible. Furthermore, many of the high performance and reliability features associated with modern relational database are available to be used.

Figure 4:
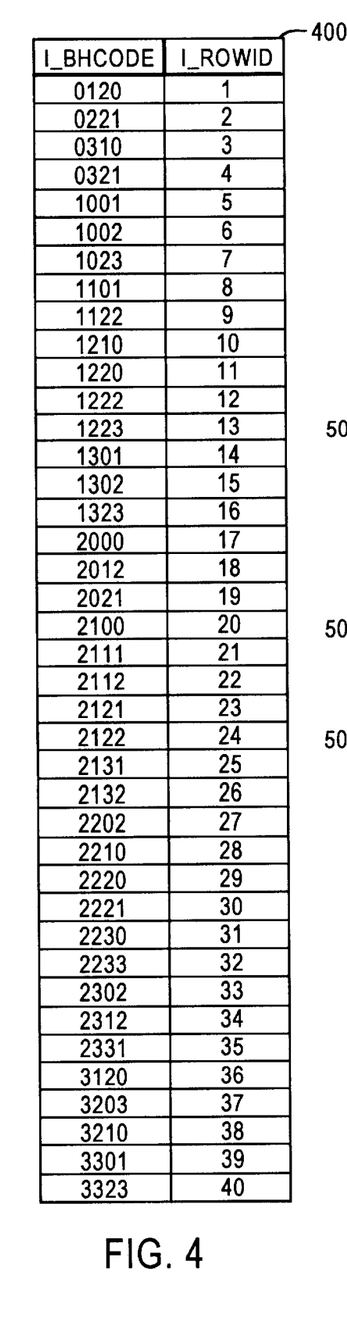
FIG. 4 illustrates an intermediate table for use in partitioning data.

Accordingly, an intermediate table I is created having the BH codes from table/view A and a reference to the corresponding rows in table/view A (step 202). Preferably, the reference is a "rowid" which is a unique (within the table), system-generated identifier for each row. However, the reference may alternatively be a primary key value of table/view A or other unique value such as a disk address for the start of the row. The intermediate table I can be created by the following SQL statement: create table I as select A.bhcode i_bhcode, A.rowid i_rowid from A. FIG. 4 illustrates an intermediate table I generated for the point data shown in FIG. 3.

In step 204, a starting level L at which there cannot be any partitions having more rows than allowed by the MAX parameter is determined. A row belongs to a partition at a particular level L if the first L digits of the BH code correspond to the partition. For example, partition $P_{01}$ is specified to level 2; thus, point 0120 belongs in partition $P_{01}$ because 01 are the first 2 digits of 0120, but point 2202 does not belong to partition $P_{01}$ because 22 (not 01) are the first 2 digits of 2202. Consequently, each level of partitioning is examined until no partition contains more than MAX rows. This examination can be performed using the following SQL statement: select count(*) from I group by bhgroup (bhsubstr(i_bhcode, L)) having count(*)>MAX, wherein the function bhsubstr extracts a substring of length L from i_bhcode, truncating i_bhcode to the first L digits or padding i_bhcode to L digits as appropriate.

In the working example, at level one, the one-digit BH code groups that exceed the exemplary MAX parameter of 5 are BH code group 1 with 12 rows and BH code group 2 with 19 rows. Furthermore, at level two, the two-digit BH code groups that exceed the MAX parameter of 5 are BH code group 21 with 7 rows and BH code group 22 with 6 rows. It is only at level three that there are no three-digit BH code groups. Consequently, the starting level parameter L is determined to be 3 in the working example.

It is evident that the working example of forty (40) points and a MAX parameter of 5 is small for purposes of explanation, while real-world environments typically deal with much larger data sets, such as a million points, and a partition size of ten thousand. Accordingly, with so many points it is unlikely that any of the first few levels would be an appropriate starting level. Consequently, one embodiment allows the user to specify a "guess" starting level to eliminate examining those early levels that are unlikely to success. If no guess is provided, then a default guess such as 4 is made. If the guess is too high, then successively larger levels of partitioning would be investigated.

In step 206, a set of BH code groups $\{c_i\}$ at the ascertained starting level L is determined. This set of BH code groups can be obtained from such an SQL statement as select bhgroup from I group by bhgroup (bhsubstr(i_bhcode, L)). TABLE 1 depicts the thirty-one (31) BH code groups that would be determined in the working example.

TABLE 1

| 012 | 100 | 121 | 200 | 211 | 221 | 231 | 320 |
|-----|-----|-----|-----|-----|-----|-----|-----|
| 022 | 102 | 122 | 201 | 212 | 222 | 233 | 330 |
| 031 | 110 | 130 | 202 | 213 | 223 | 312 | 332 |
| 032 | 112 | 132 | 210 | 220 | 230 | 320 |     |

In step 208, the level parameter L is set to the next higher level and a set of common codes $cc_i$ corresponding to each possible partition at that level with a count of the rows in the possible partition is generated. In the working example, level parameter L is decremented from 3 to 2, and the set of common codes is generated. Fourteen (14) generated common codes $cc_i$ with their counts are shown in TABLE 2.

TABLE 2

| 01-1 | 10-3 | 13-3  | 22-6* | 32-2 |
|------|------|-------|-------|------|
| 02-1 | 11-1 | 20-3  | 23-3  | 33-3 |
| 03-2 | 12-4 | 21-7* | 31-1  |      |

In step 210, the counts are examined to determine whether any of the common codes $cc_i$ exceed the MAX partition parameter. If none of the common codes $cc_i$ exceed the MAX partition parameters, then the following step 212 is skipped. In the working example, however, two common codes, 21 and 22, marked with an asterix (*) in TABLE 2, qualify. Accordingly, execution branches to step 212. By comparing common code prefixes of the BH codes for the data set, combining point data and non-point data (e.g. areas) the same table as well as data characterized by different resolutions or precisions are supported. Since the precision of a BH code is related to the number of digits in the BH codes with different lengths can also be stored in the same table.

At step 212, those groups at level L+1 whose number of rows at level L exceed the MAX partition parameter are the groups for which a partition should be created at level L+1. Accordingly, these groups are inserted as rows 502 into a merge table M 500, shown in FIG. 5. Since the rows in these are now accounted for, they are removed from the original BH code groups. TABLE 3 depicts the BH code groups $\{c_i\}$ after the first set removed.

TABLE 3

| 012 | 100 | 121 | 200 |     | 231 | 320 |
|-----|-----|-----|-----|-----|-----|-----|
| 022 | 102 | 122 | 201 |     | 233 | 330 |
| 031 | 110 | 130 | 202 |     | 312 | 332 |
| 032 | 112 | 132 |     | 230 | 320 |     |

Step 214 controls a loop in which steps 208, 210, and 212 are repeated until the list of BH code groups $\{c_i\}$ becomes empty or the level L reaches 1 or any other minimum level of partitioning appropriate for the implementation environment, e.g. 2 If either of these conditions is reached, then the loop terminates, proceeding to step 216. Otherwise, execution loops back to step 208. In the working example, neither condition holds, because L=2>1 and the list of BH code groups $\{c_i\}$ is not empty. Accordingly, execution loops back to step 208.

At step 208 on the second iteration, L is set to 1, and a set of common codes $cc_i$ corresponding to each possible partition at that level with a row count is generated. In the working example, level parameter L is decremented from 3 to 2, and the set of the fourteen (14) generated common codes cci with their counts is shown in TABLE 4.

TABLE 4

| 0-4 | 1-12* | 2-19* | 3-5 |
|-----|-------|-------|-----|

Back in step 210, the counts are examined to determine whether any of the common codes $cc_i$ exceed the MAX partition parameter. In the working example, however, two common codes, 1 and 2, marked with an asterix (*) in TABLE 2, qualify Accordingly, execution branches to step 212, where those groups at level L+1 whose number of rows at level L exceed the MAX partition parameter are the groups for which a partition should be created for at level L+1. Accordingly, these groups are inserted as rows 504 into a merge table M 500, shown in FIG. 5. Since the rows in these are now accounted for, they are removed from the original BH code groups. TABLE 5 depicts the BH code groups $\{c_i\}$ after the second set has been removed.

TABLE 5

| 012 |     |     | 320 |
|-----|-----|-----|-----|
| 022 |     |     | 330 |
| 031 |     | 312 | 332 |
| 032 |     | 320 |     |

Figure 5:
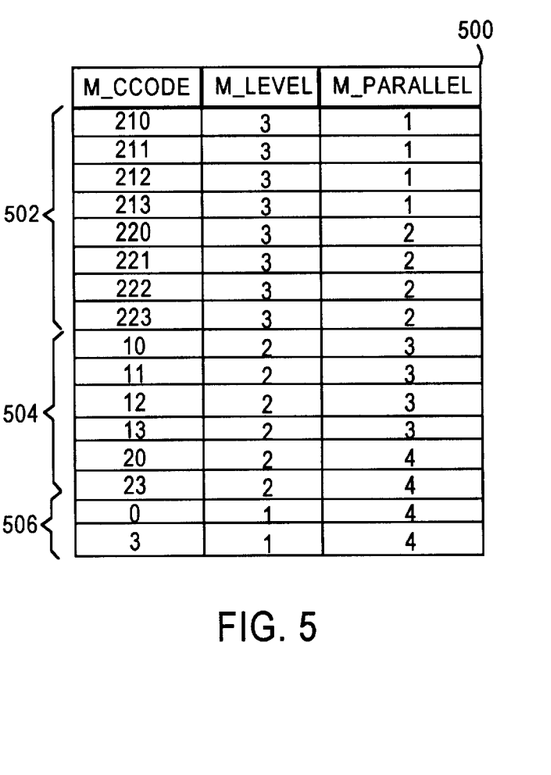
FIG. 5 illustrates a merge table for use in partitioning data.

Now at step 212, it is determined that the level L parameter triggers the loop exit condition, which causes the remaining groups at the level to written into the merge table M 500 as rows 506 in FIG. 5. As a result of performing steps 202–214, a merge table M 500 is generated that lists all the partitions to be created for the data set. In the working example of forty (40) points, sixteen partitions are to be created.

Creating the Partitions

Figure 6:
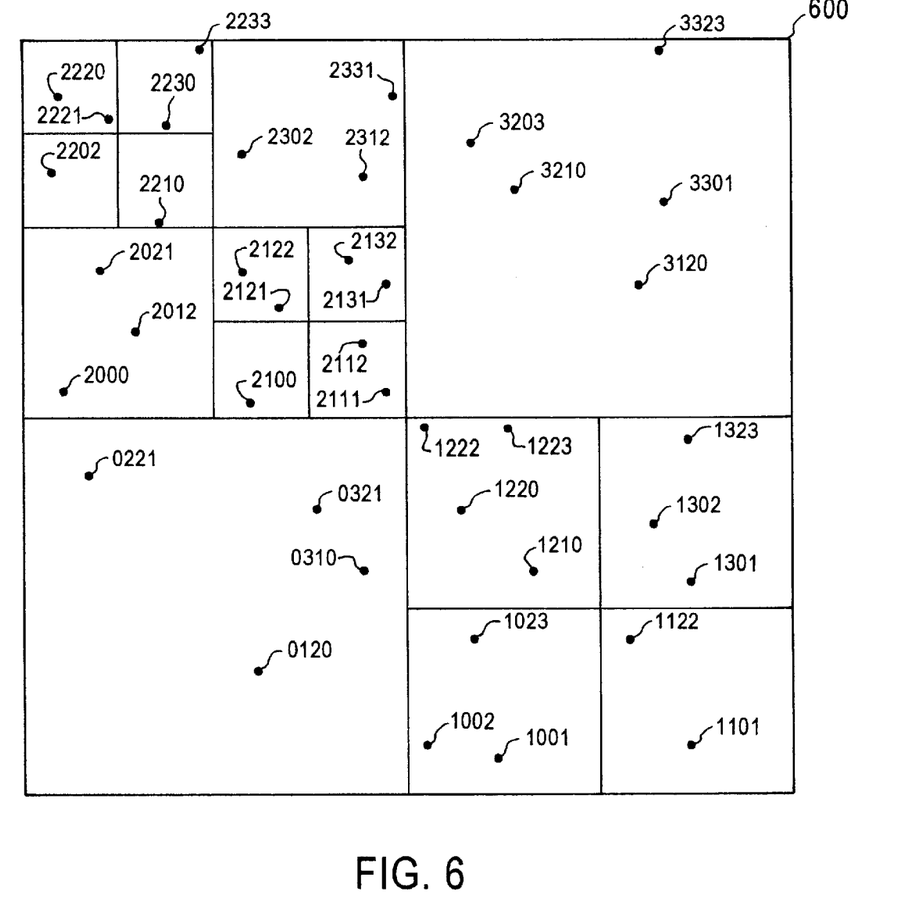
FIG. 6 shows a partitioning of the exemplary space of FIG. 3.

After the merge table M 500, which lists all the partitions to be created, has been generated, it is possible to generate the partitions based on the merge table M and the table/view A with a join operation. FIG. 6 depicts the partitioning of the exemplary data set in accordance with the partitions identified in merge table M 500. The join operation to create the partitions, however, is likely to require many passes over the table/view A, which is computationally expensive. For example, if table/view A has a million rows and merge table M identified a hundred partitions, then generating the partitions may involve a hundred scans of table/view A, reading a total of 100 million rows. Therefore, an additional action is preferably performed to break down the table/view A into a set of smaller sized data units.

Accordingly, the set of k common codes in merge table M is broken down int p groups, where p is the square root of k. A column for storing which of the p group the common code belongs to is added to the merge table M. In FIG. 5, the column is called "M_PARALLEL." The rows in the intermediate table I 400 which correspond to the common codes for each group are moved into a temporary table T1. During this process the common codes for the group are loaded into memory and all are compared against intermediate table I in a single scan. Thus, there would be p scans over the data set an p temporary tables T1 . . . Tp would be created. In the large example, with a million-row table/view A and a hundred-row merge table M, there would a total of ten (square root of one hundred) scans over the data set. Finally, looping through the common codes, the partitions are created by joining the temporary tables with the table/view A based on the rowid in the intermediate table I. In this step there would a hundred scans over one tenth the data size, which is equivalent to ten scans of table/view A. Consequently, the total net number of scans over the data set is twenty scans, which compares very favorable to the one hundred scans of the naïve implementation.

Figure 7:
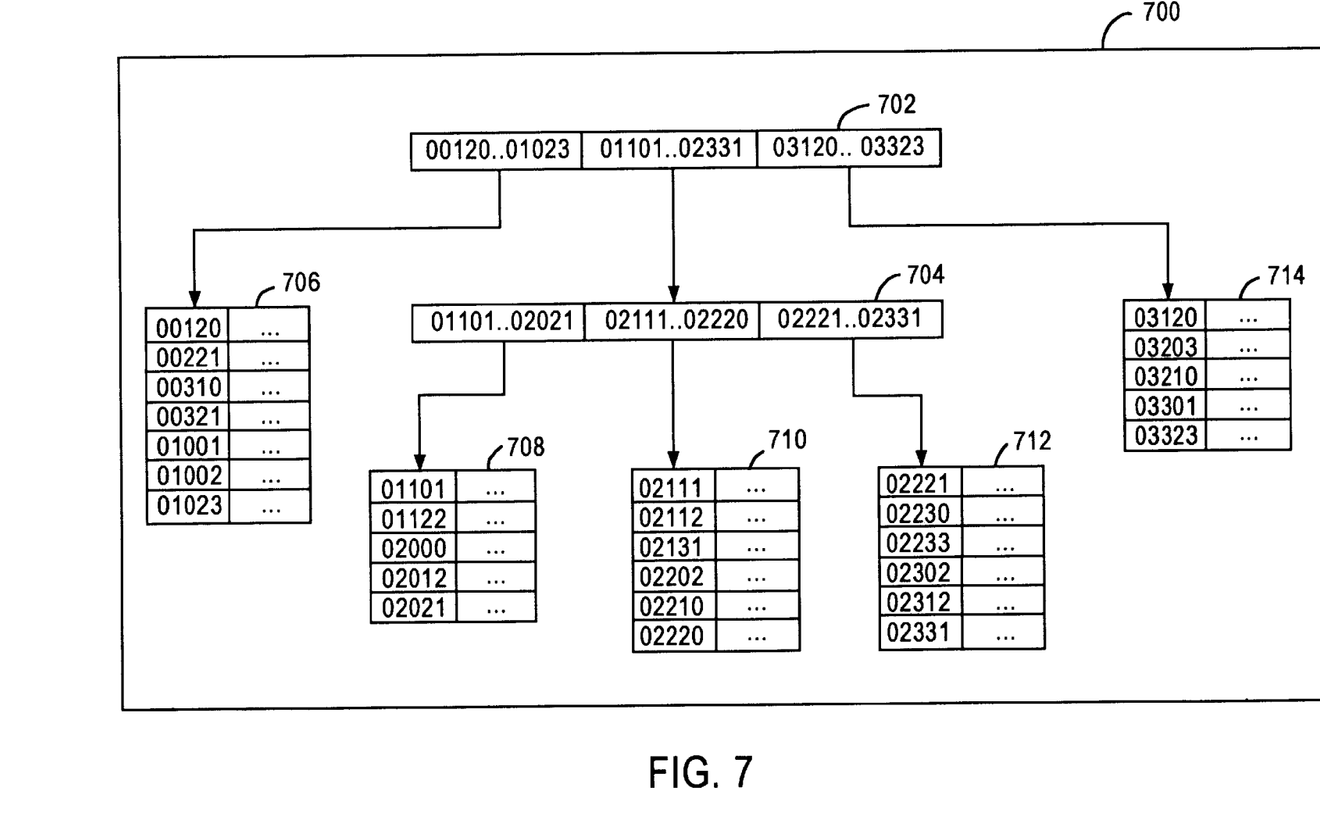
FIG. 7 depicts an index-organized partition.

The partitions may be stored in a variety of formats, such as a relation database table, but one embodiment stores the partitions as an index-organized table to improve query performance due to intra-partition clustering of data. An index-organized table is a data container that is organized like a tree data structure, such as a B-tree index. FIG. 7 illustrates a partition, unrelated to the working example, that is organized and stored as a B-tree using the BH code as an index key. A B-tree is a hierarchical arrangement of two types of nodes: leaf nodes and branch nodes. Leaf nodes reside at the lowest level of the B-tree hierarchy and contain key values, which are BH codes, and the values from the remaining columns of the corresponding rows. Leaf nodes may contain data for many rows, e.g. 100 rows, but, for purposes of example, leaf nodes are illustrated herein as containing a few rows. For example, B-tree organized partition 700 has leaf nodes 706–714 714 collectively holding the data for the partition. Specifically, leaf node 706 holds data for seven rows. As another example, leaf node 708 contains data for five rows.

The non-leaf nodes of a B-tree index are branch nodes. Branch nodes contain information that indicates a range of values. In the illustrated index-organized partition 700, nodes 702 and 704 are branch nodes and therefore each corresponds to a range of values. The range of values indicated by each branch node is such that all nodes that reside below a given branch node correspond to the values that fall within the range of values for the given branch node. For example, node 704 is a branch node that corresponds to the lexical BH code range from 01101 to 02331. Consequently, nodes 708, 710, and 712, which all reside below node 704 in the hierarchy, correspond to rows with BH codes that fall within the range from 01101 to 02331.

When an index-organized partition is created, rows having BH code that are lexically close together tend to be located in the same leaf nodes and therefore tend to the stored in the same disk blocks. Since BH codes have the property that closely located points tend to have lexically close BH codes, rows that are close together in the multi-dimensional space are physically stored near each other, often in the same disk block. Consequently, one disk input/output operation to fetch a disk block containing leaf nodes is likely to be enough for rows that are close together in the multi-dimensional space, thereby providing an efficient access methodology.

In one embodiment, a data container is organized, not by partitioning the data in the sense of storing each subset of the data container in separate datafiles as in other embodiments, but by storing the data container as an index-organized table in which the ranges specified by the branch nodes correspond to the proposed partitions identified in steps 200–214.

Repartitioning Data

Figure 8:
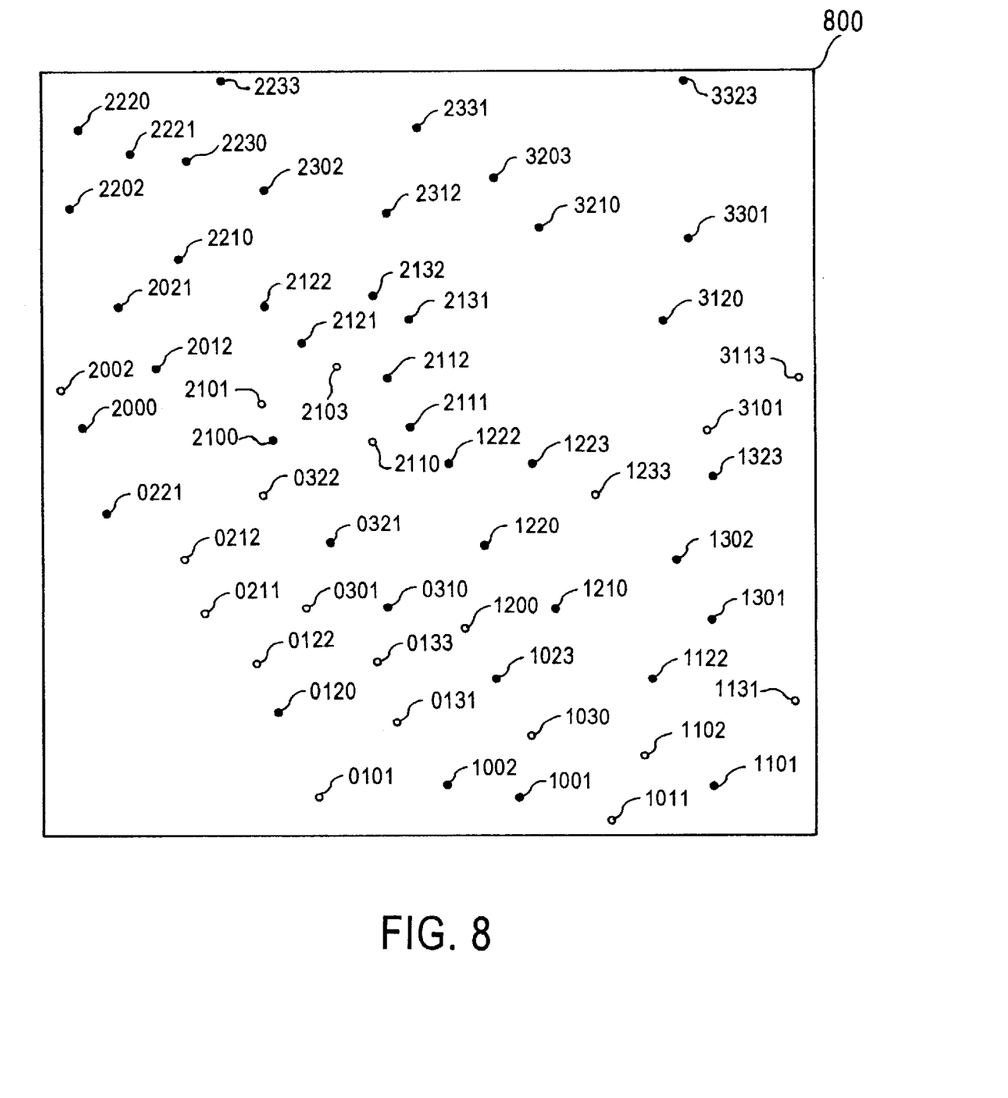
FIG. 8 depicts the exemplary space of FIG. 3 with additional points to be partitioned.

Another aspect of the invention relates to incremental partitioning of newly added data. For example, FIG. 8 depicts a working example in which twenty (20) new points, designated with open circles, are added to a partitioned data object already containing forty (40) points, designated with closed circles.

Figure 9:
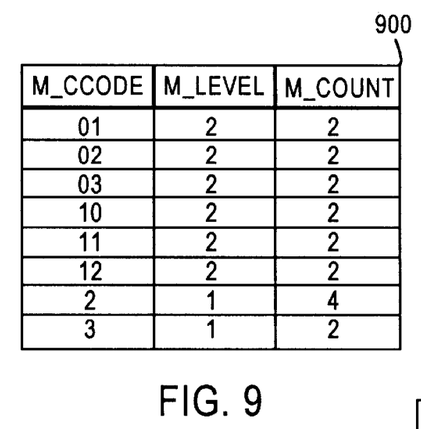
FIG. 9 illustrates a merge table for use in repartitioning data.

According to one embodiment, when data is added in bulk, it is not necessary to re-analyze the entire data set, which can be an expensive operation if the existing data set is very large. Instead, the new data is analyzing to determine which partitions of the partitioned data object are affected. Therefore, steps 200 through 214 are performed using the new bulk data as input to build a merge table. FIG. 9 illustrates a merge table 900 that is built for the new bulk data. Merge table 900 includes a column M_CCODE. for storing a common code prefix of the BH code of proposed partitions of the bulk data. The level column M_LEVEL indicates how long is the corresponding BH code prefix. Merge table 900 is also illustrated with an extra column M_COUNT for purposes of explanation, which indicates how many rows in the logical partitions M_CCODE of the new bulk data.

Figure 10:
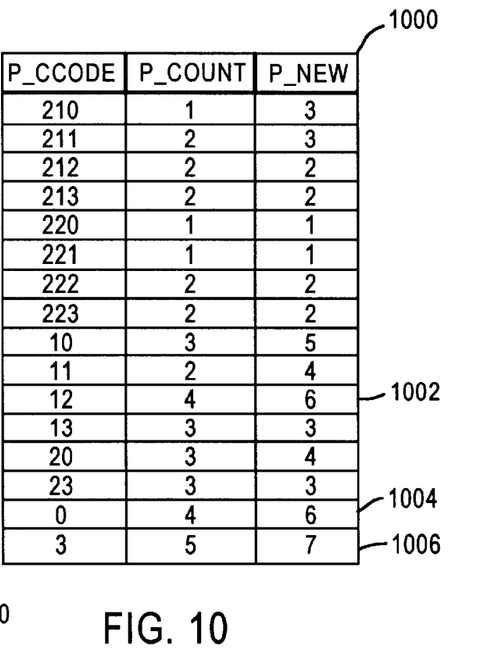
FIG. 10 illustrates a partition table for use in repartitioning data.

After the merge table 900 has been created, each proposed partition is compared against an existing partition in the partitioning data object. Referring to FIG. 10, partition table 1000 contains the partitions in the data object (P_CCODE) and the number of rows in each partition (P_COUNT). The partition table 1000 is typically a data dictionary file that is created when the partitioned object is created and kept up to date with inserts and deletes of rows within the partitioned data object. When the proposed partition is compared against the existing partitions, one of three eventualities will occur: (1) the proposed partition corresponds to an existing partition; (2) the proposed partition corresponds to existing subset partitions; and (3) the proposed partition corresponds to an existing superset partition. Comparisons are made on a proposed-partition basis rather than based on each new data item individually, because it is more efficient to move a group of rows in a single DML statement rather than in separate DML statements.

When the proposed partition corresponds to an existing partition, the new data is coalesced into the existing partition and the corresponding row count is incremented by the number of new rows (shown for convenience in P_NEW). If the adjusted row count exceeds the MAX parameter, then the data in the partition is repartitioned according to the above-described methodology, taking the partition as the whole data. In the example, proposed partition 10 corresponds to existing partition 10. Therefore, the two rows of proposed partitioned 10 are inserted into existing partition 10, for a total of 5 rows, within the MAX parameter. Likewise, the two rows of proposed partitioned 11 are coalesced with the 2 rows of existing partition 11.

Figure 11:
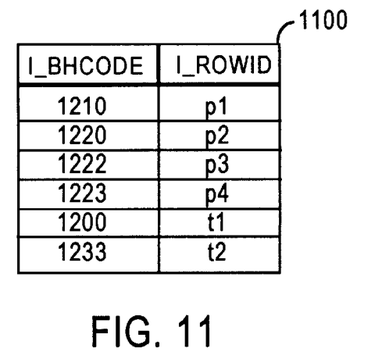
FIG. 11 illustrates an intermediate table for use in repartitioning a partition.

For proposed partition 12, on the other hand, an insertion of its two rows into existing partition 12, causes the row count to exceed 5, the MAX parameter (see entry 1002). Referring to FIG. 11, a new intermediate table 1100 is built by a union of the rows in the existing partition 12 and the rows in the new bulk data starting the with the BH code for the partition. After the intermediate table 1100 is created, steps 204 to 216 are executed, thereby repartitioning the existing partition 12. Coalescing data from proposed partition 3 into existing partition 3 also requires a repartitioning operation for partition 3 (see entry 1006).

When the proposed partition corresponds to existing subset partitions, the new rows having common BH code prefixes for the existing subset partitions are selected and coalesced into the corresponding existing subset partitions. In the example, the four new rows of data from proposed partition 2 are inserted into existing partitions 210, 211, and 20. Since none of these insertions result in an excessive row count for the existing partitions, this part of the process is complete.

When the proposed partition corresponds to an existing superset partition, the new rows are inserted into the existing superset partition. The aggregate of the insertions into the existing superset partition will generally cause the new row count to exceed the MAX parameter and necessitate a repartitioning of the existing superset partition. In the example, inserting data from proposed partitions 01, 02, and 03 into existing partition 0 (see entry 1004) results in a repartition of the existing partition 0.

Figure 12:
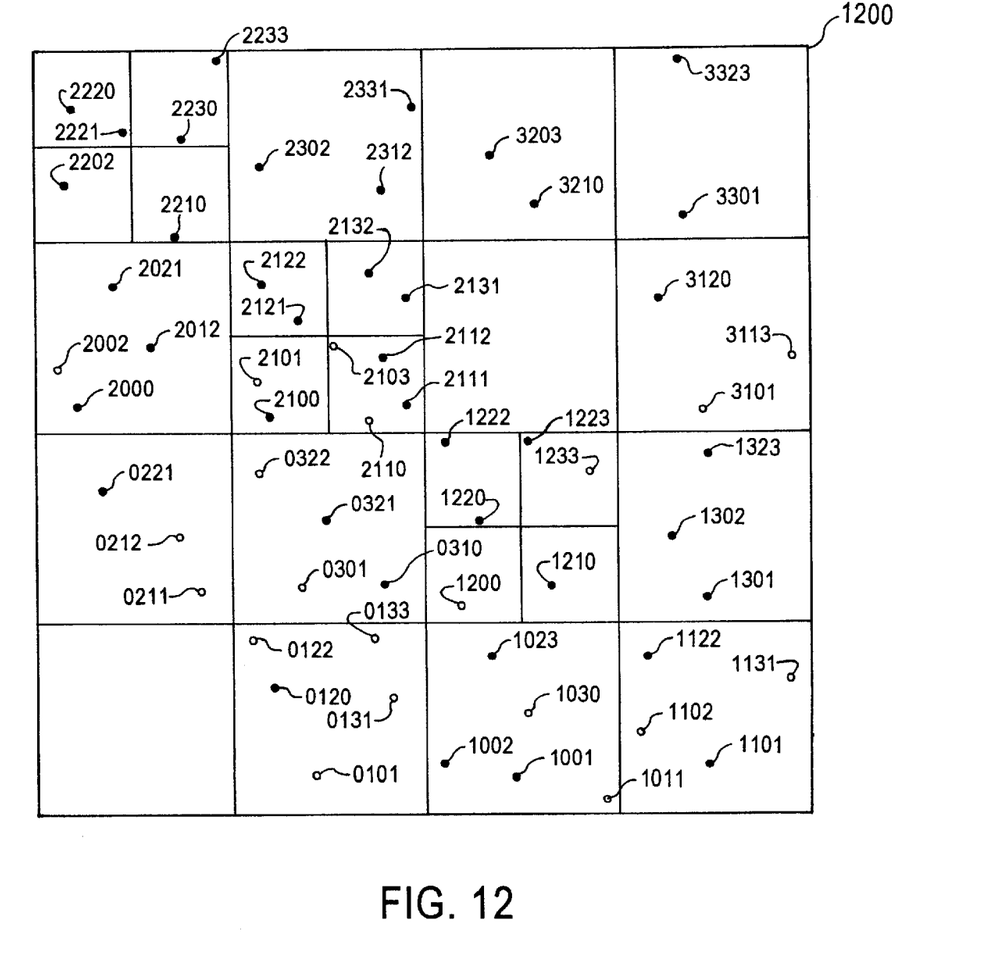
FIG. 12 shows results of repartition the augmented exemplary space of FIG. 8.

If data is to be deleted from a partition, the rows are simply deleted from the partition and the row count is adjusted accordingly. A check is made to see if the sum of the row counts of the partition and other partitions with which the partition can be coalesced is less than the MAX parameter. If the partitions can be coalesced according to the MAX parameter, then they are coalesced. A result of partitioning the new data according to the example is depicted in FIG. 12.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of organizing data in a data container including a plurality of records, each of said plurality of records including a plurality of fields, said method comprising the computer-implemented steps of:

determining codes for corresponding records of said plurality records based on bit-interleaving values from at least two of said plurality of fields belonging to said corresponding records;

creating a first database object having a plurality of rows corresponding to said plurality of records and a first column for holding said codes for said corresponding records and a second column for holding a reference to said corresponding records;

creating a second database object containing prefixes of said codes based on said first database object; and subdividing the data container into a plurality of subsets based on said second database object.

2. The method of claim 1, wherein the data container is accessible to a user during the step of subdividing the data container based on said first database object.

3. The method of claim 2, wherein the step of subdividing the data container into plurality of subsets includes the step of partitioning the data container into a plurality of partitions.

4. The method of claim 2, further comprising the step of storing said plurality of subsets as a tree data structure having a plurality of entries corresponding to said plurality of records arranged in an order dictated by said codes for said corresponding records.

5. The method of claim 2, wherein at least of one of the bit interleaved values is non-spatiotemporal.

6. The method of claim 1, wherein the step of subdividing the data container into a plurality of subsets includes the steps of:

grouping entries of the second database objects into 'p' groups, wherein p is a square root of a number of the entries of the second database; and separately joining each of the groups with the data container to form the subsets.

7. A method of organizing data in a data container including a plurality of records, each of said plurality of records including a plurality of fields, said method comprising the computer-implemented steps of:

determining codes for corresponding records of said plurality records based on bit-interleaving values from at least two of said plurality of fields belonging to said corresponding records;

subdividing the data container into a plurality of subsets based on said codes; and storing said plurality of subsets as a tree data structure having a plurality of entries corresponding to said plurality of records arranged in an order dictated by said codes for said corresponding records.

8. The method of claim 7, wherein the step of storing said plurality of subsets includes the step of storing said plurality of subsets as a B-tree data structure indexed on said codes.

9. The method of claim 7, wherein at least of one of the bit interleaved values is non-spatiotemporal.

10. A computer-readable medium bearing instruction for organizing data in a data container including a plurality of records, each of said plurality of records including a plurality of fields, said instructions arranged for causing one or more processors to perform the steps of:

determining codes for corresponding records of said plurality records based on bit-interleaving values from at least two said plurality of fields belonging to said corresponding records;

creating a first database object having a plurality of rows corresponding to said plurality of records and a first column for holding said codes for said corresponding records and a second column for holding a reference to said corresponding records;

creating a second database object containing prefixes of said codes based on said first database object; and subdividing the data container into a plurality of subsets based on said second database object.

11. The computer-readable medium of claim 10, wherein the data container is accessible to a user during the step of subdividing the data container based on said first database object.

12. The computer-readable medium of claim 10, wherein the step of subdividing the data container into a plurality of subsets includes the step of partitioning the data container into a plurality of partitions.

13. The computer-readable medium of claim 10, further comprising the step of storing said plurality of subsets as a tree data structure having a plurality of entries corresponding to said plurality of records indexed on said codes for said corresponding records.

14. The computer-readable medium of claim 10, wherein at least of one of the bit interleaved values is non-spatiotemporal.

15. The computer-readable medium of claim 10, wherein the step of subdividing the data container into a plurality of subsets includes the steps of:

grouping entries of the second database objects into 'p' groups, wherein p is a square root of a number of the entries of the second database; and separately joining each of the groups with the data container to form the subsets.

16. A computer-readable medium bearing instruction for organizing data in a data container including a plurality of records, each of said plurality of records including a plurality of fields, said instructions arranged for causing one or more processors to perform the steps of:

determining codes for corresponding records of said plurality records based on bit-interleaving values from at least two of said plurality of fields belonging to said corresponding records;

subdividing the data container into a plurality of subsets based on said codes;

storing said plurality of subsets as a tree data structure having a plurality of entries corresponding to said plurality of records arranged in an order dictated by said codes for said corresponding records.

17. The computer-readable medium of claim 16, wherein the step of storing said plurality of subsets as a tree data structure having a plurality of entries corresponding to said plurality of records indexed on said codes for said corresponding records includes the step of storing said plurality of subsets as a B-tree data structure arranged in an order dictated by said codes.

18. The computer-readable medium of claim 16, wherein at least of one of the bit interleaved values is non-spatiotemporal.

* * * * *